United States Patent
Joshi

(10) Patent No.: US 7,849,137 B2
(45) Date of Patent: Dec. 7, 2010

(54) INTERACTIVE CONTRIBUTION WIDGET

(75) Inventor: Vikas Vasudeo Joshi, Pune (IN)

(73) Assignee: Harbinger Knowledge Products, Maharashtra (IN)

( * ) Notice: Subject to any disclaimer, the term of this patent is extended or adjusted under 35 U.S.C. 154(b) by 162 days.

(21) Appl. No.: 12/166,540

(22) Filed: Jul. 2, 2008

(65) Prior Publication Data

US 2009/0013042 A1 Jan. 8, 2009

(30) Foreign Application Priority Data

Jul. 5, 2007 (IN) ...................... 1293/MUM/2007

(51) Int. Cl.
*G06F 15/16* (2006.01)

(52) U.S. Cl. ..................... 709/204; 709/203; 715/201; 715/738; 715/751; 715/743; 725/135; 725/119

(58) Field of Classification Search ......... 709/203–204; 715/201, 738, 751, 753; 725/119, 135
See application file for complete search history.

(56) References Cited

U.S. PATENT DOCUMENTS

| | | | | |
|---|---|---|---|---|
| 7,016,011 B2 * | 3/2006 | De Haan | .................. | 352/43 |
| 7,152,092 B2 * | 12/2006 | Beams et al. | .............. | 709/204 |
| 7,620,902 B2 * | 11/2009 | Manion et al. | .............. | 715/758 |
| 7,756,945 B1 * | 7/2010 | Andreessen et al. | ......... | 709/217 |
| 2004/0133640 A1 * | 7/2004 | Yeager et al. | .............. | 709/204 |
| 2007/0106627 A1 * | 5/2007 | Srivastava et al. | ............. | 706/20 |
| 2007/0169165 A1 * | 7/2007 | Crull et al. | .................. | 725/135 |
| 2007/0186007 A1 * | 8/2007 | Field et al. | .................. | 709/233 |
| 2007/0266093 A1 * | 11/2007 | Forstall et al. | .............. | 709/204 |
| 2008/0009344 A1 * | 1/2008 | Graham et al. | ................ | 463/25 |
| 2008/0034040 A1 * | 2/2008 | Wherry et al. | .............. | 709/204 |
| 2008/0034314 A1 * | 2/2008 | Louch et al. | ................ | 715/778 |
| 2008/0091777 A1 * | 4/2008 | Carlos | ........................ | 709/204 |
| 2008/0120325 A1 * | 5/2008 | Davis | ........................ | 707/102 |
| 2008/0133495 A1 * | 6/2008 | Fischer | .......................... | 707/5 |
| 2008/0134035 A1 * | 6/2008 | Pennington et al. | ......... | 715/713 |
| 2008/0134085 A1 * | 6/2008 | Clark | .......................... | 715/810 |
| 2008/0168367 A1 * | 7/2008 | Chaudhri et al. | ............ | 715/764 |
| 2008/0244414 A1 * | 10/2008 | Marcoullier et al. | ........ | 715/738 |
| 2008/0244681 A1 * | 10/2008 | Gossweiler et al. | ......... | 725/133 |
| 2008/0270038 A1 * | 10/2008 | Partovi et al. | ................. | 702/19 |
| 2009/0006213 A1 * | 1/2009 | Lerman et al. | ................ | 705/14 |
| 2009/0198581 A1 * | 8/2009 | Lidestri | ....................... | 705/14 |
| 2009/0198622 A1 * | 8/2009 | Temte et al. | ................... | 705/80 |
| 2009/0228824 A1 * | 9/2009 | Forstall et al. | .............. | 715/779 |
| 2009/0260022 A1 * | 10/2009 | Louch et al. | ................ | 719/328 |
| 2009/0313224 A1 * | 12/2009 | Fields et al. | .................... | 707/3 |
| 2010/0023863 A1 * | 1/2010 | Cohen-Martin | ............. | 715/723 |
| 2010/0070485 A1 * | 3/2010 | Parsons et al. | .............. | 707/709 |

* cited by examiner

*Primary Examiner*—Alina N. Boutah
(74) *Attorney, Agent, or Firm*—Kusner & Jaffe

(57) ABSTRACT

A system and a method for facilitating interactions between users such as social interactions across computer networks such as the Internet are disclosed. In one embodiment herein, a plurality of distributed user computers, each user computer capable of accessing a webpage is provided. An interactive contribution widget (ICW) is provided that comprises an ICW server application for providing social interactions, and an ICW player for allowing the users to interact with each other. As per the embodiments of the invention, the ICW player is executed on a small space on the webpage being accessed by the user computer, thereby facilitating the users to interact with each other while staying on the said webpage.

22 Claims, 5 Drawing Sheets

INTERACTIVE CONTRIBUTION WIDGET

FIELD OF INVENTION

The embodiments herein relate to social networks for facilitating individuals at remote locations to contribute their social data.

DESCRIPTION OF THE BACKGROUND ART

With increase usage of communication networks such as the Internet, relationships between individuals at remote locations have significantly increased. As a result, social networks on the Internet have come into picture to facilitate an individual to contact and interact with other individuals on various issues.

Such social networks play a vital role in the day-to-day lives of the individuals who use them for interacting with different other people. For example, in case of education and training, several thousand students pursuing a common educational course may interact with each other to share their views, knowledge, and course material etcetera.

Recently many websites and 'Blogs' sites on the Internet have become popular where a user can contribute his/her knowledge, and/or article on a common subject. However, these sites are often not structured and allow the users to anytime edit the content of the written article. This way, these sites lack a control on the modification of the written materials contributed by the users. Further, a user who is reading those various articles and written materials on the subject of his/her concern, is unable to decide as to which article is the best and most accurate. The particular user is then likely to visit other websites and read similar articles to verify the accuracy of the previously read article. This may therefore waste time of the user. Similarly, to gain more information or to interact with other users, a particular user might require to leave a webpage or his/her current context and visit another webpage.

Therefore a need exists to provide a more organized controlled and in-context social interaction between users.

SUMMARY OF THE INVENTION

An object of the present invention is to facilitate individuals at remote locations to contribute their social data in such a way that they are allowed to remain in context while sharing their data.

Another object of the present invention is to facilitate individuals at remote locations to contribute their social data in an organized manner.

In accordance with this, there is provided a system and a method for facilitating interactions between users such as social interactions across computer networks such as the Internet. In one embodiment herein, a plurality of distributed user computers is provided wherein; each user computer is capable of accessing a webpage. An interactive contribution widget (ICW) having an ICW server application for providing social interactions, and an ICW player for allowing the users to interact with each other are also provided. The ICW player is executed on a small space on the webpage being accessed by the user computer, thereby facilitating the users to interact with each other while staying on the said webpage. In other words, the user does not need to leave a web page to interact with other users. The webpage may include a webpage from the Internet and/or a local page of the user computer.

In one embodiment herein, the ICW provides a framework for displaying different types of interactive contribution models (ICM's), which can be used to collaborate with peer groups, providing biased opinions, which helps to calculate relevance of social data being inserted by the users, wherein the social data includes ideas, opinions, knowledge, experiences, anecdotes, queries, responses, and debate etcetera. The social data may be processed by the ICW server application before displaying to the users so as to present more relevant and accurate data before the users.

As per an embodiment herein, the relevance of social data may be calculated by a relevance calculator provided within the ICW server. Depending on the ICM type, the logic used by the relevance calculator may be different.

According to an embodiment of the invention, the ICW provides a framework to display multiple ICM's in a single ICW player which can be customized and the users may be allowed to select an ICM of their interest from a single point of interface.

In one embodiment herein, the ICW player and ICW server application communicate to each other by using a unique messaging format that comprises an Interactive contribution Model (ICM) type and data. The ICW server application may also maintain an updatable social content database for updating all instances (social data) of the interactive contribution widget (ICW) in real time and thereafter instantaneously notifying the ICW player about the same. The ICW player then displays the updated data to the user.

Other objects, features and advantages of the invention will be apparent from the drawings, and from the detailed description that follows below.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DESCRIPTION OF THE INVENTION

Disclosed herein are a system and a method for facilitating interactions between users such as social interactions across computer networks such as the Internet. Accordingly, an interactive contribution widget (ICW) is provided that pulls in updated information and relevant data to present social data in an organized manner. The ICW provides a framework for displaying different types of interactive contribution models (ICM's), which can be used to collaborate with peer groups, providing biased opinions, which helps to calculate relevance of social data to present social data in a more focused manner. In one embodiment, a relevance calculator is provided, which calculates the relevance of the social data depending on the type of ICM. This helps to add weightage to the content without affecting it. It also provides a framework to host multiple ICM's in a single user interface (ICW player) which can be customized.

In the following description, for purpose of explanation, specific details are set forth in order to provide an understanding of the invention. It will be apparent, however, to one skilled in the art that the invention may be practiced without these details. One skilled in the art will recognize that embodiments of the present invention, some of which are described below, may be incorporated into a number of different systems.

Reference in the specification to "one embodiment" or "an embodiment" means that a particular feature, characteristic, or function described in connection with the embodiment is included in at least one embodiment of the invention. The appearances of the phrase "in one embodiment" in various places in the specification are not necessarily all referring to the same embodiment.

Figure 1:
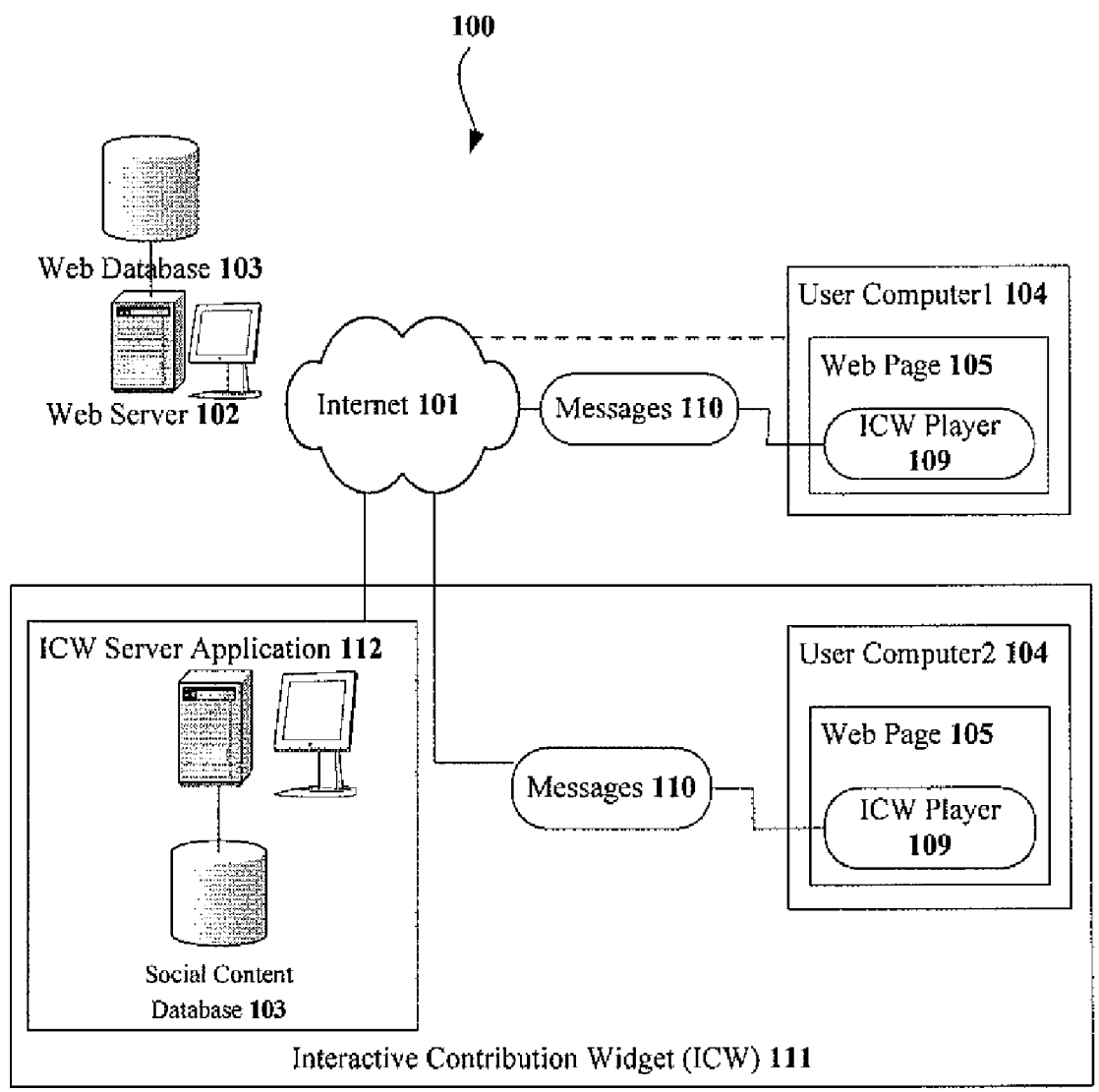
FIG. 1 illustrates the system for facilitating social interactions between users across the Internet as per an embodiment herein.

FIG. 1 is the block diagram of the system 100 for facilitating interactions between users such as social interactions across computer networks such as the Internet 101 as per an embodiment of the invention. As per this embodiment, the system 100 comprises a plurality of distributed user computers 104 (user computer1, user computer2 and so on), each user computer 104 capable of accessing a webpage 105. An interactive contribution widget (ICW) 111 is provided comprising an ICW server application 112 for providing social interactions, and an ICW player 109 for allowing the users to interact with each other. The ICW player 109 is executed on a small space on the webpage 105 being accessed by the user computer, thereby facilitating the users to interact with each other while staying on the said webpage 105. In other words, the user does not need to leave a web page to interact with other users. Therefore the system allows the user to interact in context.

The users may use different web pages 105 over Internet 101. Web pages 105 can either be downloaded from a web server 102 through the Internet 101. The dotted line 107 in the figure indicates that a webpage is being downloaded from a web server 102 which might be stored in a web database 103. The web page 105 can also be a local machine page which may not be uploaded on any web server 102.

As mentioned above, the interactive contribution widget 111 comprises an ICW server application 112 and ICW player 109 and both these components communicate with each other through messages 110 in a unique format. Users through their user computers 104 can perform operations involved in social networking on any of the different types of interactive contribution models (ICM's) using the Interactive Contribution Widget Player (ICWP) 109. The ICMs can be used to collaborate with peer groups, providing biased opinions, which in turn help to calculate relevance of social data to present social data in a more focused manner. This results in a message 110 which may be sent to the interactive contribution widget server (ICWS) application 112 for processing. The ICWS application 112 maintains an updatable social content database 113 and updates all instances of the interactive contribution widget (ICW) 111 in real time and instantaneously notifies the ICW player about the updates.

As will be understood by those who are skilled in the art, the present invention could be embodied in other specific forms without departing from the essential characteristics thereof. For example, ICW 111 providing different ICM's, can be used at any location such as web page, blog, online courses on LMS, etc., where real-time interaction through open participation with peer contributors is needed.

Figure 2:
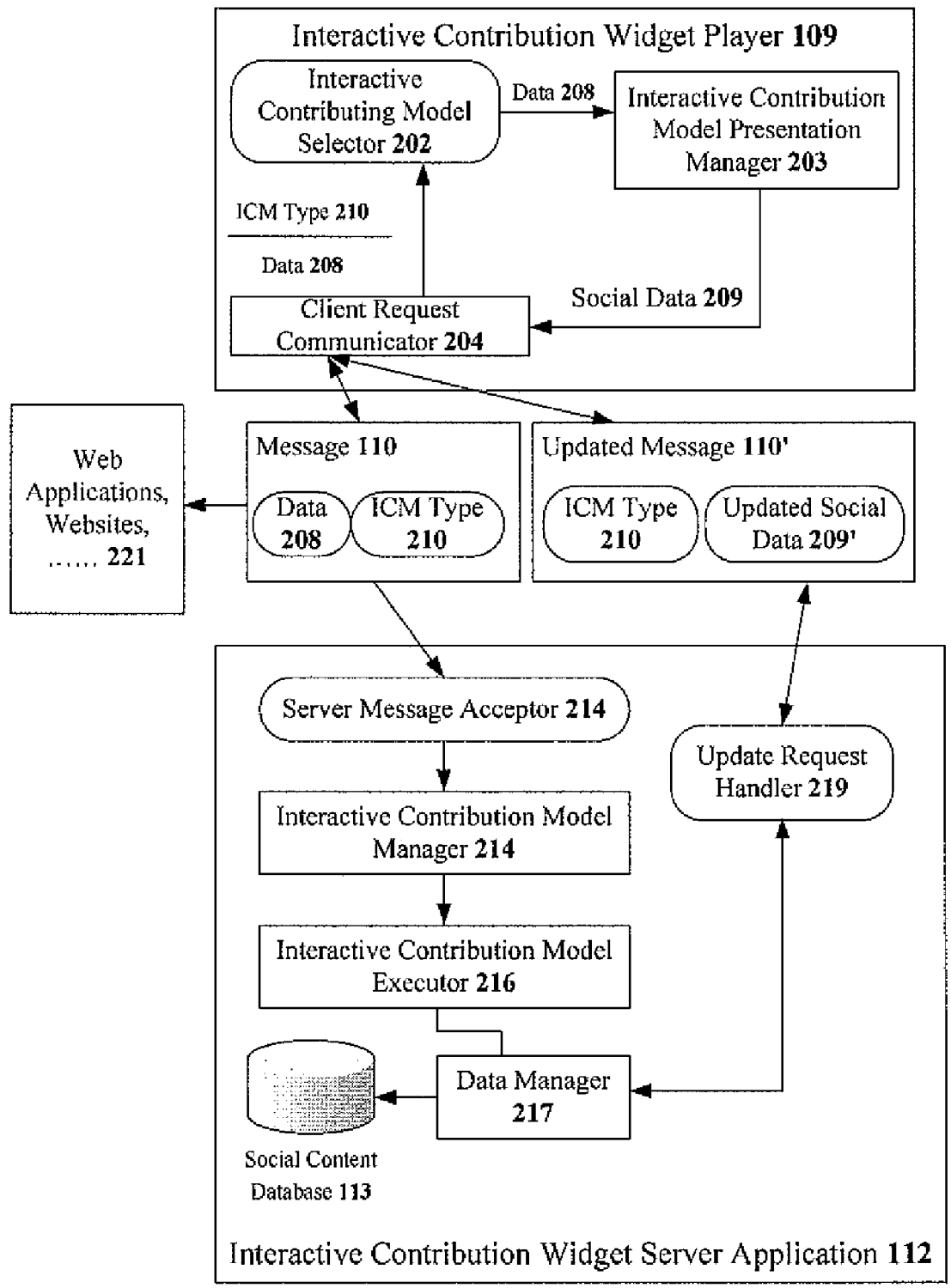
FIG. 2 illustrates the functional components of interactive contribution widget as per an embodiment herein.

FIG. 2 illustrates the two major functional components of the interactive contribution widget 111 as per an embodiment herein. As explained in the description of FIG. 1, the two major components of ICW 111 are the interactive contribution widget player (ICWP) 109, and interactive contribution widget server (ICWS) application 112.

The ICWP 109 and ICWS application 112 interact using a unique messaging format 110, which consists of an interactive contribution model (ICM) type 210 and data 208. ICM type 210 specifies the type of data in the message 110. This messaging format is the binding factor between the ICWP 109 and ICWS 112.

The ICW player 109 may consist of an interactive contribution model selector (ICMS) 202, an interactive contribution model presentation manager 203, and a client request communicator 204 for facilitating the users to interact.

The interactive contribution model selector (ICMS) 202 may provide a framework to integrate a plurality of ICM's in a single ICW player 109. Thus, a user may be able to select an ICM of his interest from a single point of interface. He/she may not need to go to any other browser or follow any outbound links to get social data 209 from peer contributors. The ICMS 202 selects the appropriate ICM type 210 from the message 110 received from ICWS application 112 and provides social data 209 to be played by the interactive contribution model presentation manager 203.

The ICW server application 112 may consist of a server message acceptor 214, an update request handler 219, an interactive contribution model manager 215, an interactive contribution model executor 216, the database 113 and a data manager 217.

The client request communicator 204 sends update request message 110', consisting of ICM type 210 to the update request handler 219 on server-side and the ICW server application 112 receives updated social data 209'. The update request handler 219 is called to store the updated information in a cache. A cache can be a temporary storage for faster request processing. When a user inserts a social data 209 in the ICM presentation manager 203, it is sent to the client request communicator 204 to create appropriate message 110 and thereafter sent to the ICWS application 112 for processing.

When a request message 110 comes to ICWS application 112, the server message acceptor 214 accepts the message 110 and forwards the updated social data 209' and ICM type 210 to the interactive contribution model manager 215. The interactive contribution model manager 215 uses the ICM type 210 to detect the type of ICM and forwards the social data 209 to appropriate interactive contribution model executor 216. The interactive contribution model executor 216 performs all the processing related to the ICM and stores the updated social data 209' in the database 113 using the data manager 217.

The message 110 which is received from the ICWS application 112 can be even sent to other web applications, websites 221 in the form of services. These web applications, sites 221 interpret the message and can use the data 208 according to their requirement.

Figure 3A:
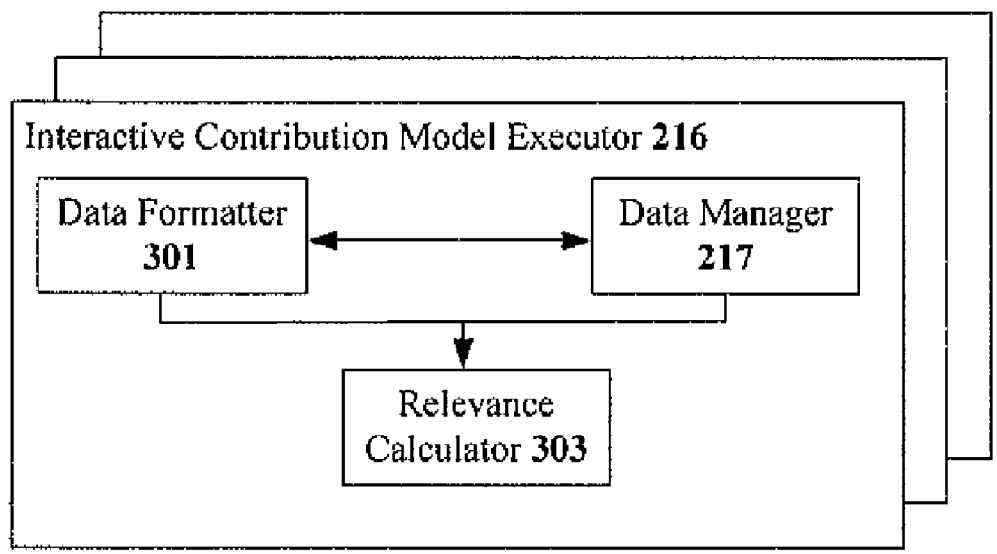
FIG. 3(a) is the block diagram of the interactive contribution model executor as per an embodiment herein.

FIG. 3(a) is the block diagram of the interactive contribution model executor 216 as per an embodiment herein. The executor 216 comprises a data formatter 301, the data manager 217, and a relevance calculator 303.

As per an embodiment herein, the data formatter 301 accepts the social data 209 entered by user through his/her user computer 104. The social data 209 is then interpreted by the data formatter 301 according to the specifications set for a particular ICM. This processed data is stored in database 113 in an appropriate format using the data manager 217. The processed data from data formatter 301 and data manager 217 is provided to the relevance calculator 303. Every ICM uses a separate logic to calculate the relevance of the social data 209, Depending on the ICM type, the logic used by the relevance calculator may be different. This is the main component of system 100 where the social data 209 is processed to get social information.

Figure 3B:
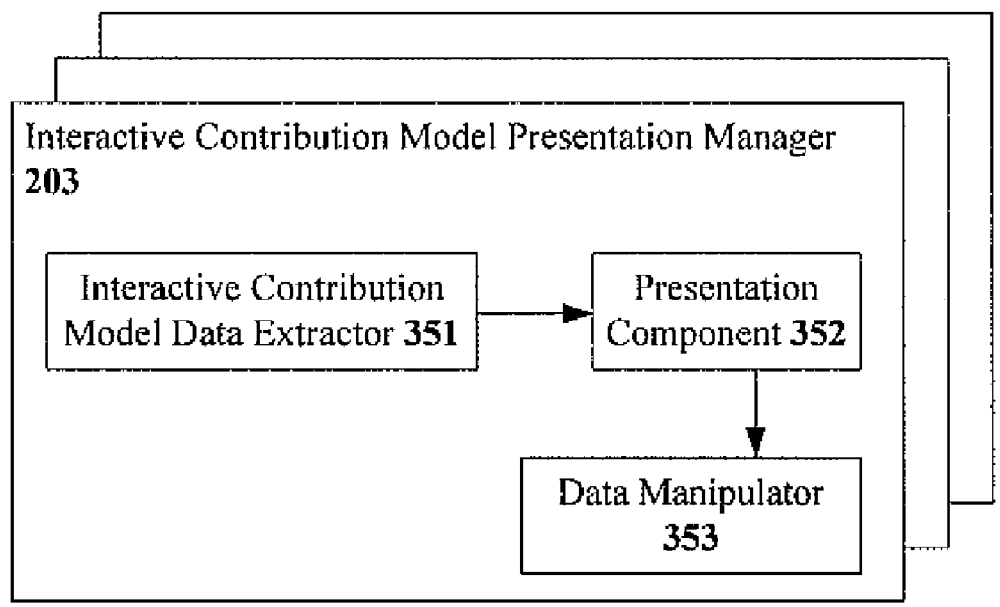
FIG. 3(b) is the block diagram of the interactive contribution model presentation manager as per an embodiment herein.

FIG. 3(b) is the block diagram of the interactive contribution model presentation manager as per an embodiment herein. The interactive contribution model presentation manager comprises an interactive contribution model data executor 351, a presentation component 352, and a data manipulator 353.

The ICW 111 provides a framework where multiple ICM's may be embedded in one widget, which allows users to get all the required information in desired form at one stop location. For every ICM supported by the framework, there is an interactive contribution model data executor 351, which is used to interpret the data 208 provided by the ICWS application 112. It interprets the data 208 and selects appropriate presentation component 352 to play the data 208. Every ICM has a corresponding presentation component 352, which helps the framework to provide different ways of presenting the data 208. User can enter data 208 in a particular ICM. This data is collected by the presentation component 352 and forwarded to the data manipulator 353 which manipulates the social data 209 in an appropriate format to be sent to the ICW server application 112.

Figure 4:
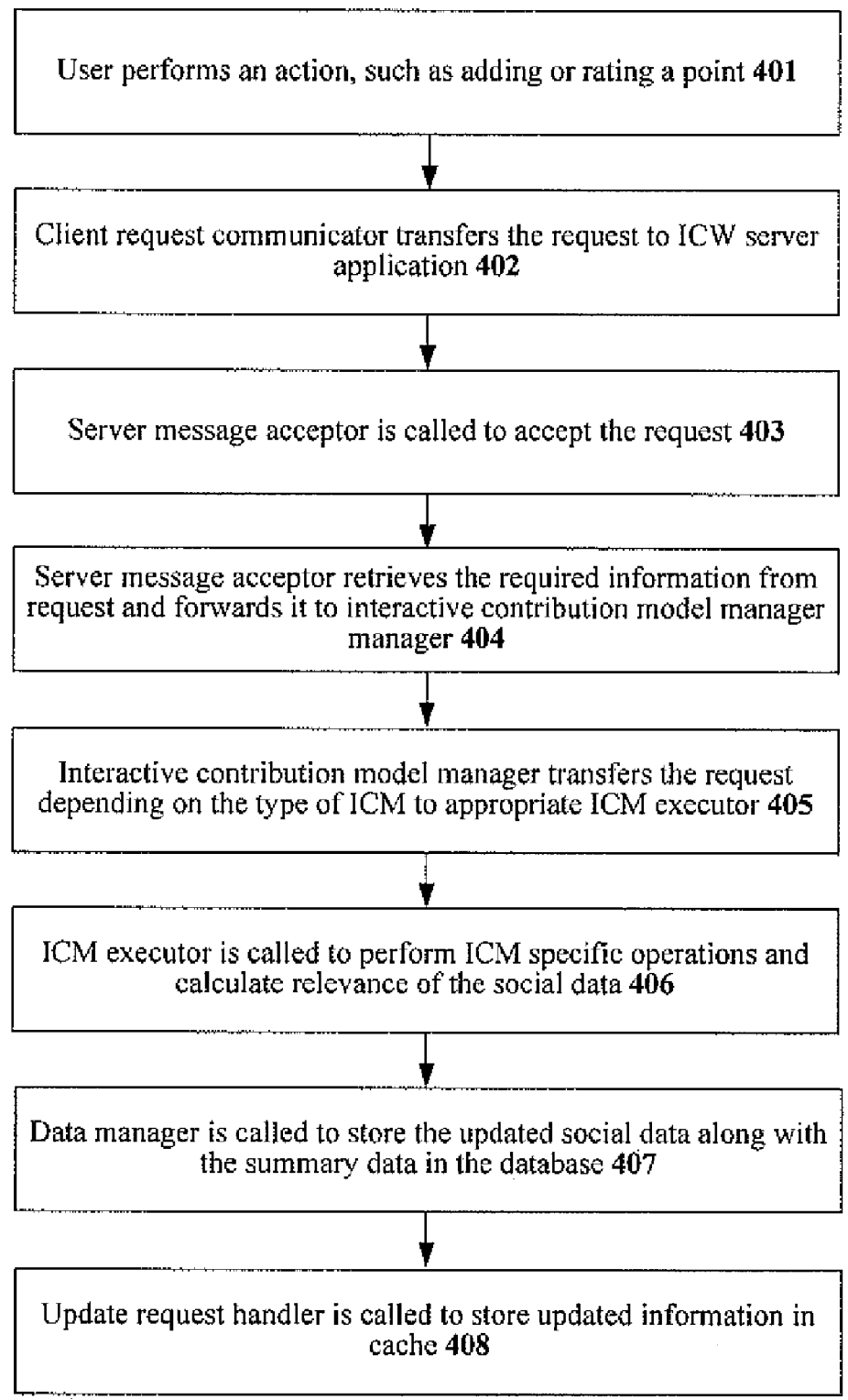
FIG. 4 is a flowchart illustrating the process of adding social data in the interactive contribution model as per an embodiment herein.

FIG. 4 is a flowchart illustrating the process of adding social data in the interactive contribution model as per an embodiment herein. In step 401, a user may perform an action to insert data in an ICM, like adding a point or rating a point. The client request communicator 204 is called to create a request which is transferred to ICW server application 112 in step 402.

In step 403 the server message acceptor accepts the request and retrieves the information from the request like data 209 and the ICM type 210 and forwards it to the interactive contribution model manager 215 in step 404.

In step 405, the interactive contribution model manager 215 transfers the request to the appropriate interactive contribution model executor 216, depending upon ICM type. In step 406 the interactive contribution model executor 216 is called to perform ICM specific operations on the social data 209 and also to calculate relevance of the data.

In step 407, the data manager 217 is called to store updated social data in the database 113 along with the social information, which is in fact the processed social data 209.

In step 408 the update request handler 219 is called to store the updated information in a cache. A cache can be a temporary storage for faster request processing.

Figure 5:
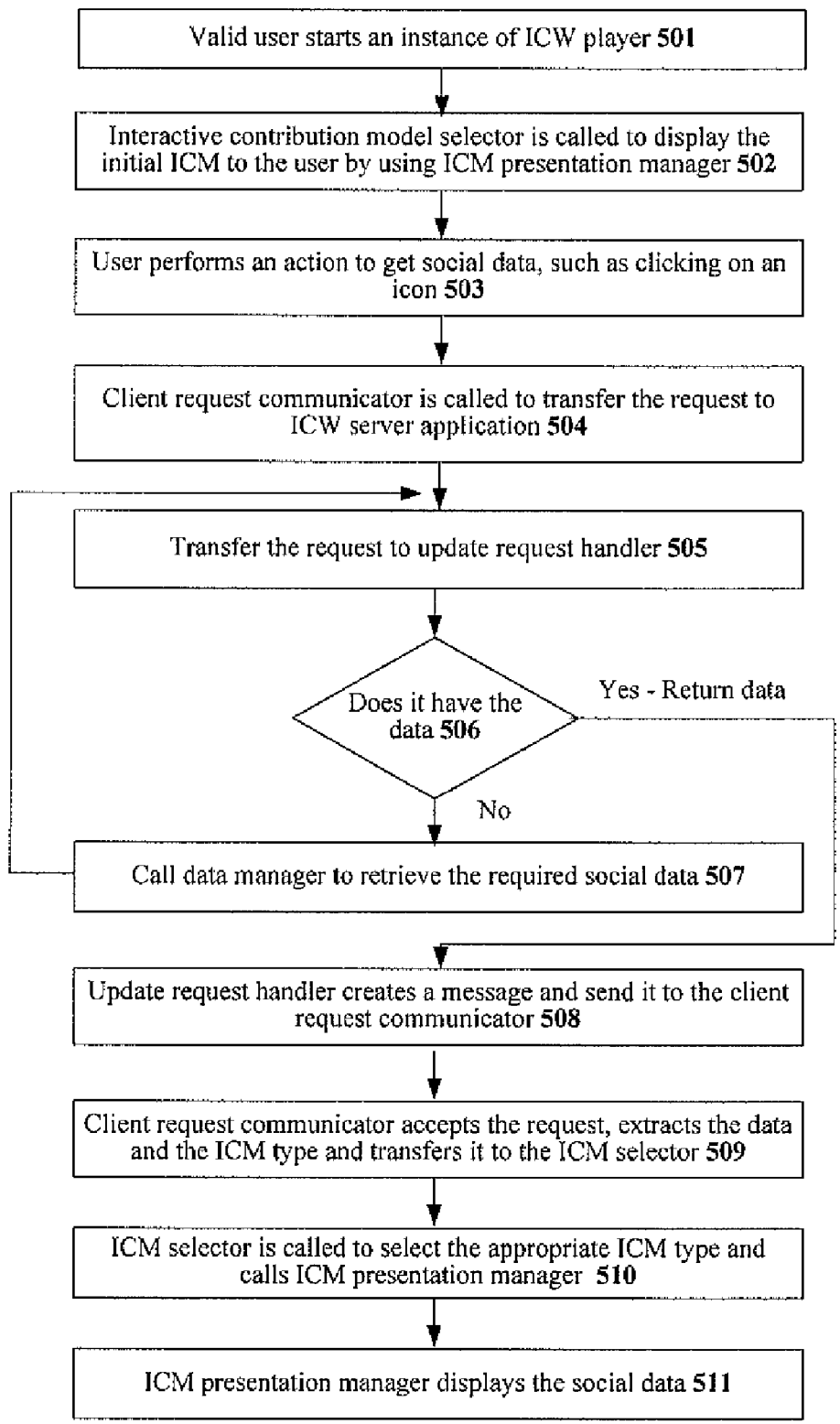
FIG. 5 is a flowchart illustrating the process of displaying the social data to the users as per an embodiment herein.

FIG. 5 is a flowchart illustrating the process of displaying the social data to the users as per an embodiment herein.

In step 501, user starts an instance of interactive contribution widget. The interactive contribution model selector 202 in step 502 displays ICM Player 109 to the user.

In step 503, user performs an action to get social data like clicking on an icon. The generated request goes to the client request communicator 204 in step 504, which transfers it to ICW server application.

In step 505, the update request handler 219 is called and it checks in step 506 whether it has the requested data or not. If the requested data is not present the request goes to data manager 217 in step 507, which returns the social data to the update request handler 219. If it has the requested data, it goes to step 508 to create a message and transfer it to the client request communicator 204.

In step 509, the client request communicator 204 accepts the request; extracts the data 209 and ICM type 211 and transfers it to the interactive contribution model selector 202. In step 510, the interactive contribution model selector 202 is called to select the appropriate ICM presentation manager 203 and transfer the control to ICM presentation manager 203.

In step 511 the ICM presentation manager 203 displays the social data 209.

The above description of the invention has been described for purposes of clarity and understanding and not to limit the invention. It is understood that various modifications may be possible within the scope of the appended claims.

Having described the invention, the following is claimed:

1. A system for facilitating social interactions between users across computer networks, the system comprising:
    a plurality of distributed user computers, each user computer capable of accessing a webpage; and
    an interactive contribution widget (ICW) comprising:
        an ICW player for allowing the users to interact with each other, wherein the ICW player is executed on a small space on the webpage being accessed by the user computer, thereby facilitating the users to interact with each other while staying on the webpage, wherein said ICW player provides a framework for displaying a plurality of different types of interactive contribution models (ICM's) which enable social interactions, including collaborating with peer groups and/or providing biased opinions, said ICM's providing information about how to display information to a user, and
        an ICW server application for providing social interactions, said ICW server application receiving social data entered by a user into the ICW player, processing the received social data based upon ICM type, calculating the relevance of social data entered by the users, and sending the processed social data to the ICW player, wherein the relevance of the social data is calculated by a relevance calculator provided within the ICW server application, said relevance calculator using a formula that is different for each ICM type.

2. The system as in claim 1, wherein the plurality of different types of interactive contribution models (ICM's) are displayed in a single ICW player which can be customized.

3. The system as in claim 1, wherein the users can select an ICM of their interest from a single point of interface.

4. The system as in claim 1, wherein the social data includes ideas, opinions, knowledge, experiences, anecdotes, queries, responses, and debate.

5. The system as in claim 1, wherein the social data can be sent to other web applications and websites in the form of services.

6. The system as in claim 1, wherein the ICW player comprises:
    at least one interactive contribution model presentation manager (ICM presentation manager) for displaying the social data received from the ICW server application, in accordance with the ICM type, said ICW player having one ICM presentation manager for each ICM type.

7. The system as in claim 6, wherein the social data is displayed in appropriate format depending on the type of ICM and the social data entered by the user.

8. The system as in claim 6, wherein the ICM presentation manager forwards the social data inserted by the user to a client request communicator residing within the ICW player in a unique messaging format.

9. The system as in claim 8, wherein the messaging format comprises an Interactive contribution Model (ICM) type and data.

10. The system as in claim 1, wherein the webpage includes an online webpage from the Internet or a local offline page residing on the user computer.

11. The system as in claim 1, wherein the ICW server application maintains an updatable social content database that updates all instances of the interactive contribution widget (ICW) in real time and instantaneously notifies the ICW player about the update.

12. A method for facilitating social interactions between users across computer networks, the method comprising the steps of:
   allowing a plurality of distributed user computers to access a webpage; and
   providing an interactive contribution widget (ICW) comprising:
      an ICW player for allowing the users to interact with each other, said ICW player executing on a small space on the webpage being accessed by the user computer, thereby facilitating the users to interact with each other while staying on the webpage, wherein said ICW player provides a framework for displaying a plurality of different types of interactive contribution models (ICM's) which enable social interactions, including collaborating with peer groups and/or providing biased opinions, said ICM's providing information about how to display information to a user, and
      an ICW server application for providing social interactions, said ICW server application receiving social data entered by a user into the ICW player, processing the received social data based upon ICM type, calculating the relevance of social data entered by the users and sending the processed social data to the ICW player wherein the relevance of the social data is calculated by a relevance calculator provided within the ICW server application, said relevance calculator using a formula that is different for each ICM type.

13. The method as in claim 12, wherein the plurality of different types of interactive contribution models (ICM's) are displayed in a single ICW player which can be customized.

14. The method as in claim 12, wherein the users can select an ICM of their interest from a single point of interface.

15. The method as in claim 12, wherein the social data includes ideas, opinions, knowledge, experiences, anecdotes, queries, responses, and debate.

16. The method as in claim 12, wherein the social data can be sent to other web applications and websites in the form of services.

17. The method as in claim 12, wherein the ICW player comprises:
   at least one interactive contribution model presentation manager (ICM presentation manager) for displaying the social data received from the ICW server application, in accordance with the ICM type, said ICW player having one ICM presentation manager for each ICM type.

18. The method as in claim 17, wherein the social data is displayed in appropriate format depending on the type of ICM and the social data entered by the user.

19. The method as in claim 17, wherein the ICM presentation manager forwards the social data inserted by the user to a client request communicator residing within the ICW player in a unique messaging format.

20. The method as in claim 19, wherein the messaging format comprises an Interactive contribution Model (ICM) type and data.

21. The method as in claim 12, wherein the webpage includes an online webpage from the Internet and a local offline page of the user computer.

22. The method as in claim 12, wherein the ICW server application maintains an updatable social content database that updates all instances of the interactive contribution widget (ICW) in real time and instantaneously notifies the ICW player about the update.

* * * * *